US009035513B2

(12) United States Patent
Funaki et al.

(10) Patent No.: US 9,035,513 B2
(45) Date of Patent: May 19, 2015

(54) VIBRATOR AND PORTABLE INFORMATION TERMINAL HAVING THE VIBRATOR

(75) Inventors: Masato Funaki, Moriguchi (JP); Hiroki Kato, Moriguchi (JP); Kazuyuki Kosuda, Moriguchi (JP)

(73) Assignees: SANYO ELECTRIC CO., LTD., Moriguchi-shi, Osaka (JP); NIDEC SEIMITSU CORPORATION, Ueda-shi, Nagano (JP)

( * ) Notice: Subject to any disclaimer, the term of this patent is extended or adjusted under 35 U.S.C. 154(b) by 294 days.

(21) Appl. No.: 13/389,123

(22) PCT Filed: Jun. 16, 2010

(86) PCT No.: PCT/JP2010/060214
§ 371 (c)(1), (2), (4) Date: Feb. 6, 2012

(87) PCT Pub. No.: WO2011/016291
PCT Pub. Date: Feb. 10, 2011

(65) Prior Publication Data

US 2012/0139367 A1 Jun. 7, 2012

(30) Foreign Application Priority Data

Aug. 7, 2009 (JP) ................................ 2009-184688

(51) Int. Cl.
*H02K 7/06* (2006.01)
*H02K 41/03* (2006.01)
*H04R 17/00* (2006.01)
*H04R 1/00* (2006.01)

(Continued)

(52) U.S. Cl.
CPC .. *H04R 7/18* (2013.01); *H04R 9/06* (2013.01); *H04R 2499/11* (2013.01)

(58) Field of Classification Search
CPC .................................... H04R 1/00; H04R 9/02
USPC ......... 310/81, 324, 12.16, 325, 327; 381/389, 381/406, 414
See application file for complete search history.

(56) References Cited

U.S. PATENT DOCUMENTS 1,478,709 A * 12/1923 Gernsback .................... 381/398
4,376,233 A * 3/1983 Kamon et al. ................ 381/409

(Continued)

FOREIGN PATENT DOCUMENTS

JP 58-54200 4/1983
JP 61-60594 4/1986

(Continued)

OTHER PUBLICATIONS

Machine Translation JP2005252925 (2005).*

*Primary Examiner* — Jose Gonzalez Quinones
(74) *Attorney, Agent, or Firm* — Drinker Biddle & Reath LLP

(57) ABSTRACT

It is possible to provide a vibrator configured so as to prevent the leakage of an adhesive out from between a frame and a diaphragm member and a portable information terminal having the vibrator. The vibrator includes: frame 11; diaphragm member 12 vibratably bonded to frame 11; and adhesive 21 used to bond the frame to the diaphragm member. To store adhesive 21, the vibrator further includes gap 22 which is formed between surfaces of frame 11 and diaphragm member 12 facing each other at bonded part 20 where frame 11 is bonded to diaphragm member 12 with adhesive 21, and the gap being used.

14 Claims, 17 Drawing Sheets

(51) Int. Cl.

| | |
|---|---|
| ***H04R 7/18*** | (2006.01) |
| ***H04R 9/06*** | (2006.01) |

(56) References Cited

U.S. PATENT DOCUMENTS

| | | | | |
|---|---|---|---|---|
| 4,820,952 | A * | 4/1989 | Lee | 310/334 |
| 6,472,797 | B1 * | 10/2002 | Kishimoto | 310/324 |
| 2006/0088181 | A1 * | 4/2006 | Kaiya et al. | 381/398 |
| 2009/0097694 | A1 * | 4/2009 | Takewa | 381/421 |

FOREIGN PATENT DOCUMENTS

| | | | |
|---|---|---|---|
| JP | 63287198 | A * | 11/1988 |
| JP | 8-163690 | | 6/1996 |
| JP | 9-322289 | | 12/1997 |
| JP | 2002-199496 | | 7/2002 |
| JP | 2002-218597 | | 8/2002 |
| JP | 2005252925 | A * | 9/2005 |
| JP | 2006-340185 | | 12/2006 |

* cited by examiner (A)

(B)

(A)

(B)

VIBRATOR AND PORTABLE INFORMATION TERMINAL HAVING THE VIBRATOR

FIELD OF THE INVENTION

The present invention relates to a vibrator and a portable information terminal, and particularly relates to the vibrator including a frame and a diaphragm member bonded to the frame at a bonded part and to the portable information terminal mounting the vibrator.

BACKGROUND ART

Examples of the vibrator including the diaphragm member secured to the frame is a speaker unit, a multifunction device (MFD) or the like. The speaker unit includes the so-called speaker and receiver, and the MFD has a speaker unit function and a vibration function.

Such a vibrator is used in mobile phones, digital cameras, personal computers, game machines, PDAs (Personal Digital Assistants), and the like.

Conventionally, the frame and the diaphragm member of a vibrator are secured to each other with an adhesive. For example, Japanese Laid-Open Patent Application No. H9-322289 (Patent Document 1) discloses a speaker unit in which an adhesive is interposed between a stepped portion of a speaker frame (frame) and a supporting portion of a diaphragm (diaphragm member) in order to support and secure the diaphragm to the speaker frame.

PRIOR ART REFERENCES

Patent Document

[Patent Document 1] Japanese Laid-Open Patent Application No. H9-322289

SUMMARY OF THE INVENTION

The Problems Solved by the Invention

In a vibrator, since a diaphragm member vibrates, the diaphragm member needs to be firmly secured to a frame. In order to firmly secure the diaphragm member to the frame, an adhesive is applied between them.

However, in the speaker unit of the above Patent Document each bonded part between the, frame and the diaphragm member has a flat shape. Due to the shape, when bonding the diaphragm member to the frame, the adhesive between the frame and the diaphragm member leaks out from an outer peripheral end of the diaphragm member to flow onto a top surface of the diaphragm member.

The diaphragm member is bonded by pressing the bonded part with a jig from the top surface of the diaphragm member. Therefore, the adhesive flowing onto the top surface of the diaphragm member adheres to the jig to cause the adhesion between the jig and the diaphragm member. As a result, there is a problem of poor workability when pressing the bonded part with the jig.

Another problem is that, when mounting a component such as a frame cover to the top surface of the diaphragm member, the mounting becomes unsteady due to the adhesive flowing onto the top surface of the diaphragm member. Still another problem is that variation occurs in the height dimensions of respective speaker units in which a component such as the frame cover is mounted to the top surface of the diaphragm member.

The present invention is devised to solve the above problems, and an object of the present invention is to provide a vibrator configured so as to prevent the leakage of an adhesive out from between a frame and a diaphragm member and a portable information terminal mounting the vibrator.

Problem Resolution Means

A vibrator of the present invention comprises: a frame; a diaphragm member vibratably bonded to the frame; an adhesive used to bond the frame to the diaphragm member; and a gap formed between surfaces of the frame and the diaphragm member facing each other at a bonded part where the frame is bonded to the diaphragm member with the adhesive, the gap being used to store the adhesive.

In the vibrator according to the present invention, the gap to store the adhesive is formed between the surfaces of the frame and the diaphragm member facing each other at the bonded part. Because the adhesive can be stored in the gap, the leakage of the adhesive out from between the frame and the diaphragm member can be prevented.

The above-described vibrator preferably comprises: a voice coil secured to the diaphragm member; and a magnet arranged at a distance from the voice coil. Since the voice coil is secured to the diaphragm member, vibration of the voice coil allows the diaphragm member to vibrate.

In the above-described vibrator, the gap is preferably arranged on a further outer peripheral side than a radial center of the bonded part. Since the gap is arranged on the further outer peripheral side than the radial center of the bonded part, upward leakage of the adhesive on the outer periphery can be more directly prevented.

In the above-described vibrator, the gap is preferably arranged at a radial center of the bonded part. Since the gap is arranged at the radial center of the bonded part, a lower surface portion of the diaphragm member is bonded to a supporting portion of the frame on both sides of the gap. Accordingly, the diaphragm member can be more stably bonded to the frame.

In the above-described vibrator, the gap is preferably arranged on a further inner peripheral side than a radial center of the bonded part. Since the gap is arranged on the further inner peripheral side than the radial center of the bonded part, the vibrator can be configured so that the gap is covered with a frame cover. Accordingly, the gap can be protected by covering with the frame cover.

In the above-described vibrator, the gap is preferably formed by forming a convex portion on the diaphragm member at the bonded part. Since the gap is formed by forming a convex portion on the diaphragm member at the bonded part, the gap can be formed by fabricating only the diaphragm member. Therefore, production efficiency when producing the vibrator can be increased.

In the above-described vibrator, the gap is preferably formed by forming a concave portion on the frame at the bonded part. Since the gap is formed by forming a concave portion on the frame at the bonded part, the formation of the gap can be achieved by fabricating only the frame. Therefore, production efficiency when producing the vibrator can be increased.

In the above-described vibrator, the diaphragm member is preferably positioned with respect to the frame by contacting with the frame at an outer peripheral end of the diaphragm member. Since the diaphragm member is positioned with respect to the frame by contacting with the frame at the outer peripheral end of the member, it is unnecessary to additionally provide a structure for positioning thereof. Therefore, production efficiency when producing the vibrator can be increased.

In the above-described vibrator, the diaphragm member is preferably positioned with respect to the frame by contacting with the frame on a further inner peripheral side than the bonded part of the diaphragm member. Since the diaphragm member is positioned with respect to the frame by contacting with the frame on the further inner peripheral side than the bonded part of the diaphragm member, displacement of the diaphragm member to the outer peripheral side can be prevented. Accordingly, the positioning of the diaphragm member with respect to the frame can be more appropriately achieved.

In the above-described vibrator, the gap preferably has a height of 0.1 mm to 0.3 mm and a width of 0.1 mm to 0.2 mm. Since the gap has the height of 0.1 mm to 0.3 mm and the width of 0.1 mm to 0.2 mm, the adhesive can be more reliably stored in the gap.

A portable information terminal according to the present invention includes any of the above-described vibrators.

Since the portable information terminal according to the invention is provided with any of the above-described vibrators, it can be prevented that, when mounting a component such as the frame cover to the top surface of the diaphragm member, the mounting becomes unsteady due to the adhesive flowing onto the top surface thereof. It can also be prevented that variation occurs in the height dimensions of respective vibrators in which a component such as the frame cover is mounted to the top surface of the diaphragm member. Therefore, the vibrator can be mounted in the portable information terminal with higher precision. Additionally, design flexibility of the portable information terminal can be improved.

Efficacy of the Invention

As described above, a vibrator and a portable information terminal according to the present invention can prevent an adhesive from leaking out from between a frame and a diaphragm member.

BRIEF DESCRIPTIONS OF THE DRAWINGS

EMBODIMENT OF THE INVENTION

Embodiments of the present invention will be described below with reference to the drawings.

(Embodiment 1)

First, a configuration of a vibrator according to Embodiment 1 of the present invention will be described. The present Embodiment will mainly describe a speaker unit as one example of the vibrator.

Figure 1:
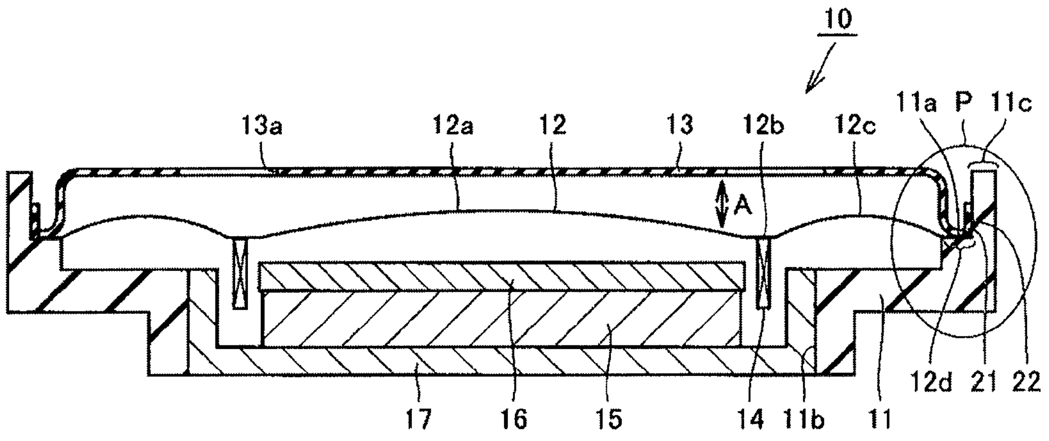
FIG. 1 is a cross-sectional view schematically showing a speaker unit according to Embodiment 1 of the present invention.
Figure 2:
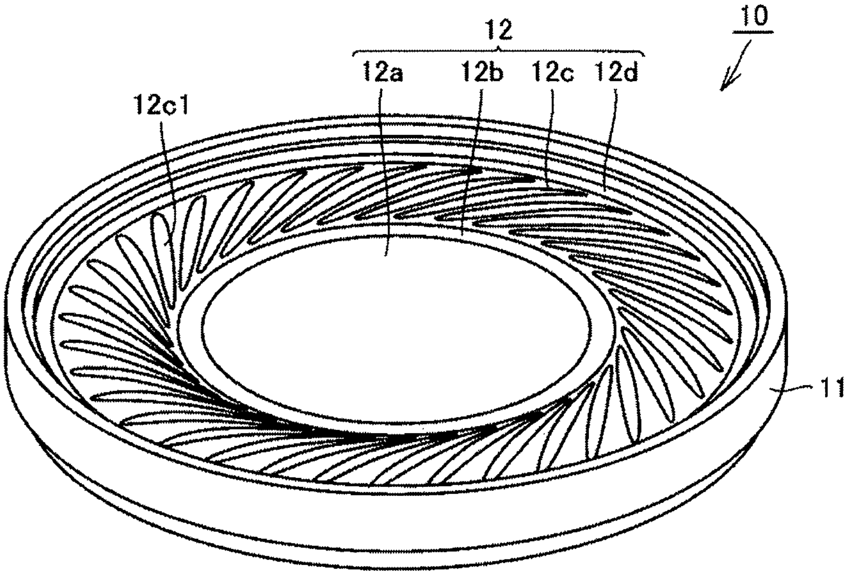
FIG. 2 is a perspective view schematically showing the speaker unit according to Embodiment 1 of the present invention.

With reference to FIGS. 1 and 2, speaker unit 10 mainly includes frame 11, diaphragm member 12, frame cover 13, voice coil 14, magnet 15, plate 16, and yoke 17. In FIG. 2, for easier view, frame cover 13 is not shown.

Frame 11 mainly includes supporting portion 11*a*, inner peripheral portion 11*b*, and top end portion 11*c*. Frame 11 is configured so that diaphragm member 12 is vibratably bonded by bonding outer peripheral portion 12*d* of diaphragm member 12 to a top surface of supporting portion 11*a*. A step between supporting portion 11*a* and inner peripheral portion 11*b* may be provided. Further, frame 11 is configured so as to support yoke 17 at inner peripheral portion 11*b*. Top end portion 11*c* is integrally formed on an outer peripheral side of supporting portion 11*a*. For example Frame 11 is formed in a circular shape when observed in planar view from upper side. Further, for example, frame 11 may be made of resin or metal.

Diaphragm member 12 is formed of a thin plate so as to be capable of vibrating in a vertical direction (a direction indicated by arrow A in FIG. 1). Diaphragm member 12 includes center portion 12*a*, flat portion 12*b* formed on an outer peripheral side of center portion 12*a*, peripheral portion 12*c* formed on an outer peripheral side of flat portion 12*b*, and an outer peripheral portion 12*d* formed on an outer peripheral side of peripheral portion 12*c*. For example, diaphragm member 12 is formed in a circular shape when observed in planar view from upper side. Center portion 12*a* and peripheral portion 12*c* are formed in an arc shape when observed in the cross-section in FIG. 1. Flat portion 12*b* is flatly formed when observed in the cross-section in FIG. 1. A plurality of grooves 12*c*1 is formed in a whirl shape on a top surface of peripheral portion 12*c* of diaphragm member 12. For example, diaphragm member 12 is made of PET (polyethylene terephthalate), PEN (polyethylene naphthalate), PEI (polyetherimide) or the like.

Frame cover 13 is formed so as to cover diaphragm member 12. Frame cover 13 may be arranged so as to cover center portion 12*a*, flat portion 12*b*, and peripheral portion 12*c* of diaphragm member 12. Frame cover 13 is supported by supporting portion 12*a* of frame 11 via diaphragm member 12. Hole 13*a* is formed on frame cover 13. For example, frame cover 13 is formed in a circular shape when observed in planar view from upper side.

A top surface of voice coil 14 is bonded to a bottom surface of flat portion 12*b* of diaphragm member 12 to secure voice coil 14 to diaphragm member 12. For example voice coil 14 is formed in a ring shape. Magnet 15 is arranged on a further inner peripheral side than voice coil 14 at a distance from an inner peripheral surface of voice coil 14 (internal magnet type). Yoke 17 includes a portion (outer peripheral side portion) arranged on a further outer peripheral side than voice coil 14 and a portion (lower side portion) arranged under voice coil 14 and magnet 15.

Yoke 17 is engaged with inner peripheral portion 11*b* of frame 11 on an outer peripheral surface of the outer peripheral side portion, in order to be secured. The lower side portion of yoke 17 is arranged at a distance from a bottom surface of voice coil 14. Magnet 15is arranged at a center of the lower side portion of yoke 17. Plate 16 is arranged on a top surface of magnet 15. Magnet 15, plate 16, and yoke 17 form a magnetic circuit.

Figure 3:
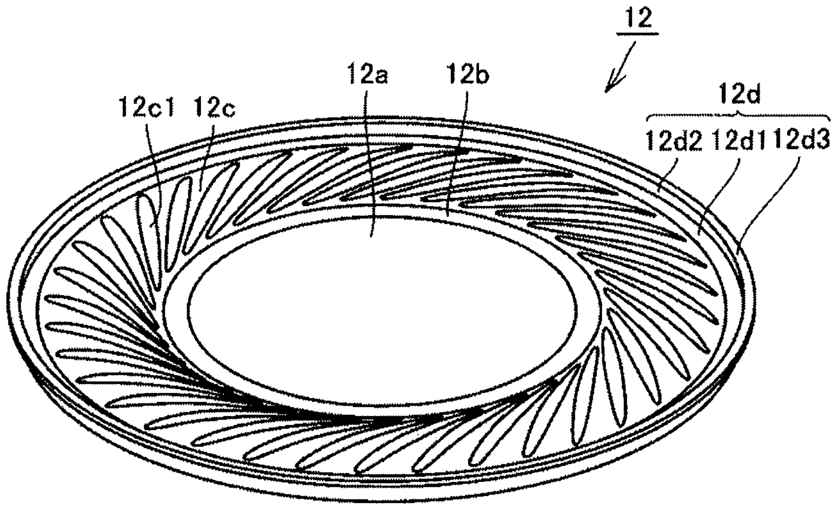
FIG. 3 is a perspective view schematically showing a diaphragm member of the speaker unit according to Embodiment 1 of the present invention.
Figure 4:
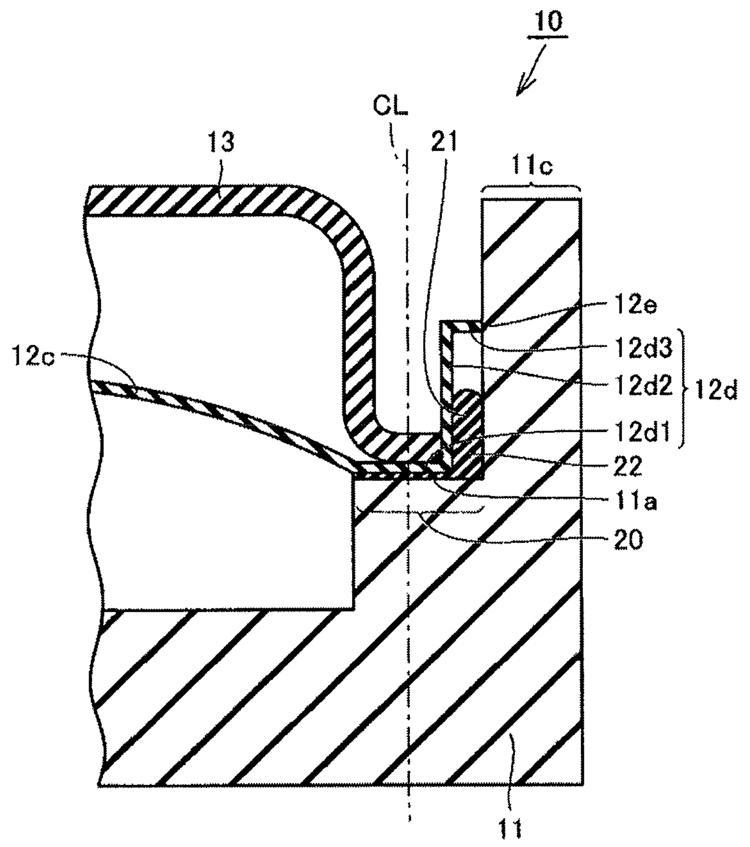
FIG. 4 is an enlarged view indicating portion P of FIG. 1

With reference to FIGS. 3 and 4, the outer peripheral portion 12*d* of diaphragm member 12 includes bottom surface portion 12*d*1, rising portion 12*d*2, and top surface portion 12*d*3. Bottom surface portion 12*d*1 is configured so as to be arranged facing supporting portion 11*a* of frame 11. Rising portion 12*d*2 is configured so as to rise from bottom surface portion 12*d*1 at a distance from an inner peripheral surface of top end portion 11*c* of frame 11. For example, rising portion 12*d*2 is formed with a height of 0.1 mm to 0.3 mm. Top surface portion 12*d*3 is configured so as to extend to the inner peripheral surface of top end portion 11*c* at a distance from the top surface of supporting portion 11*a* of frame 11. For example, top surface portion 12*d*3 is formed with a width of 0.1 mm to 0.2 mm. Outer peripheral end 12*e* of diaphragm member 12 is arranged so as to contact with the inner peripheral surface of top end portion 11*c* of frame 11.

Rising portion 12*d*2 and top surface portion 12*d*3 are configured so that diaphragm member 12 bends from rising portion 12*d*2 to top surface portion 12*d*3 to contact with the inner peripheral surface of top end portion 11*c* of frame 11 at outer peripheral end 12*e*. Gap 22 is formed between rising portion 12*d*2 and the inner peripheral surface of top end portion 11*c* of frame 1.

Bottom surface portion 12*d*1, rising portion 12*d*2, and top surface portion 12*d*3 may be provided on a part in a circumferential direction of outer peripheral portion 12*d*. In order to ensure the prevention of leakage of adhesive 21, bottom surface portion 12*d*1, rising portion 12*d*2, and top surface portion 12*d*3 are preferably provided on an entire part in the circumferential direction thereof.

Frame 11 and diaphragm member 12 are bonded to each other with adhesive 21. Bonded part 20 is a part where frame 11 is bonded to diaphragm member 12 with adhesive 21, and also a part where adhesive 21 is applied on supporting portion 11*a* of frame 11. For example, adhesive 21 is applied with a thickness of 14 μm to 50 μm between bottom surface portion 12*d*1 and supporting portion 11*a*.

Gap 22 is provided to store adhesive 21. Gap 22 is formed between surfaces of frame 11 and diaphragm member 12 facing each other at bonded part 20. Gap 22 is formed by forming a convex portion on diaphragm member 12 at bonded part 20. Gap 22 is a space surrounded by an outer peripheral surface of rising portion 12*d*2 and the bottom surface of top surface portion 12*d*3 of diaphragm member 12, and the top surface of supporting portion 11*a* and the inner peripheral surface of top end portion 11*c* of frame 11.

Gap 22 is arranged on a further outer peripheral side than a radial center of bonded part 20. The radial center of bonded part 20 refers to a middle position between an inner periphery and an outer periphery in the radial direction of bonded part 20. Virtual line CL in FIG. 4 is a line indicating the radial center of bonded part 20. Gap 22 stores adhesive 21 leaking out from between frame 11 and diaphragm member 12. Since gap 22 is arranged on the further outer peripheral side than the radial center of bonded part 20, upward leakage of the adhesive on the outer periphery can be more directly prevented. Further, as compared to when gap 22 is arranged further inside than the outer peripheral side, the diameter of frame cover 13 can be made smaller.

Gap 22 may be formed only on diaphragm member 12. In this case, gap 22 can be formed by fabricating only diaphragm member 12. Therefore, production efficiency when producing the speaker unit 10 is increased.

Next, operation of the speaker unit according to the present Embodiment will be described.

With the configuration thus formed, a magnetic field is generated by guiding magnetic flux from magnet 15 to plate 16 and yoke 17 and by converging the magnetic flux in an airspace where voice coil 14 is arranged. Then, when alternate current flows through voice coil 14, the alternate current flowing through voice coil 14 and the magnetic field generated by magnet 15 cause voice coil 14 to vertically vibrate based on Fleming's left hand rule. Accordingly, diaphragm member 12 attached to voice coil 14 vibrates. As a result, electric signals (alternating current) are converted into sound (vibration).

Next, a description will be given of a method for mounting the diaphragm member to the frame in the speaker unit according to the present Embodiment.

Figure 5:
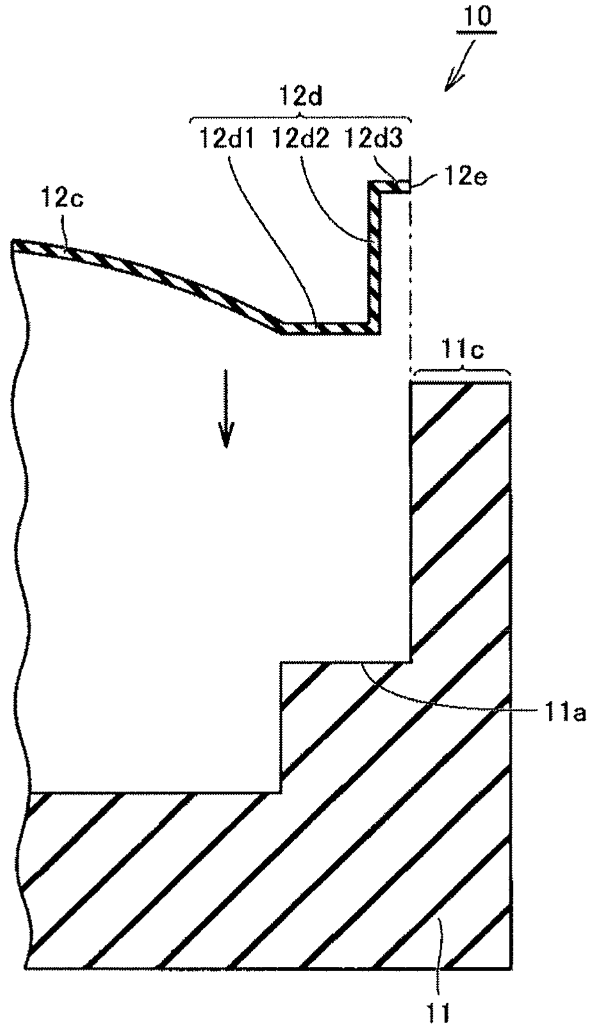
FIG. 5 is a cross-sectional view schematically showing a state in which the diaphragm member of the speaker unit according to Embodiment 1 of the present invention is mounted to the frame.

With reference to FIG. 5, diaphragm member 12 is mounted to frame 11 so that outer peripheral end 12*e* of diaphragm member 12 contacts with the inner peripheral surface of top end portion 11*c* of frame 11. Diaphragm member 12 is positioned with respect to frame 11 by contacting with frame 11 at outer peripheral end 12*e*. Since diaphragm member 12 is positioned at outer peripheral end 12*e*, it is unnecessary to additionally provide a structure for positioning. Therefore, production efficiency when producing the speaker unit 10 is increased.

Figure 6:
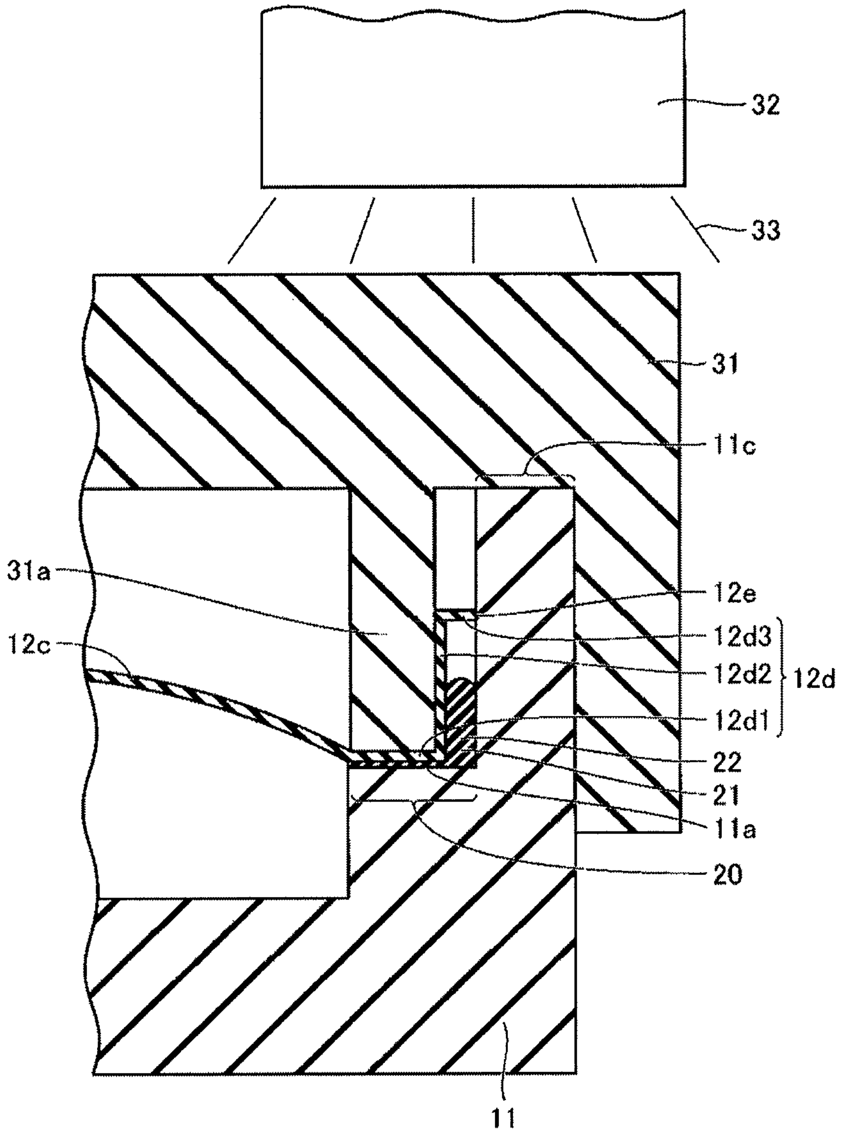
FIG. 6 is a cross-sectional view schematically showing a state in which the diaphragm member of the speaker unit according to Embodiment 1 of the present invention is bonded to the frame.

With reference to FIG. 6, jig 31 presses diaphragm member 12 to frame 11. Preferably, protruding portion 31*a* of jig 31 presses the top surface of bottom surface portion 12*d*1 of diaphragm member 12. Further, a concave portion may be provided on jig 31 to contact one of inner peripheral surfaces of the concave portion with the outer peripheral surface of top end portion 11*c* of frame 11, in order to position jig 31. Therefore, protruding portion 31*a* can precisely press the top surface of bottom surface portion 12*d*1. Furthermore, by matching a height obtained by adding a thickness of bottom surface portion 12*d*1 of diaphragm member 12 and the thickness of adhesive 21 to a height of protruding portion 31*a* with a height of top end portion 11*c* of frame 11, it can be prevented that protruding portion 31*a* excessively presses diaphragm member 12.

For example, jig 31 is made of transparent acryl resin. Further, for example, adhesive 21 is made of ultraviolet curable resin. In a state in which diaphragm member 12 is pressed by jig 31, ultraviolet irradiation apparatus 32 emits ultraviolet light 33. Ultraviolet light 33 cures adhesive 21 applied between frame 11 and diaphragm member 12 and adhesive 21 stored in gap 22. Therefore, frame 11 and diaphragm member 12 are bonded to each other with adhesive 21.

Adhesive 21 may be a photo-curable resin such as a visible light curable resin. In this case, an irradiation apparatus is used that emits light having a wavelength curing the photo-curable resin.

Additionally, as adhesive 21, a thermosetting resin or a solvent-based adhesive may be applied.

Figure 7:
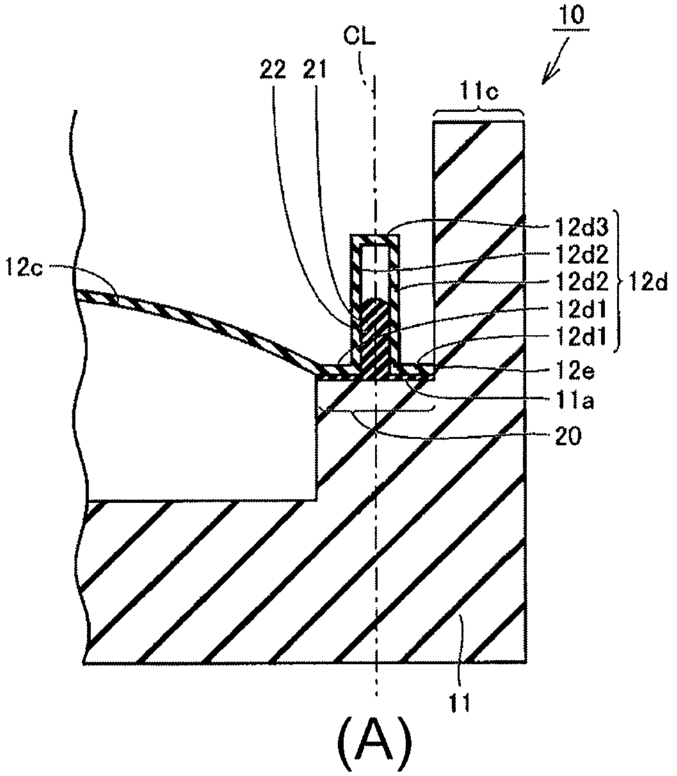
FIG. 7A is a cross-sectional view schematically showing a state in which a gap of the speaker unit according to Embodiment 1 of the present invention is arranged at a radial center of a bonded part.
FIG. 7B is a cross-sectional view schematically showing a state in which the gap is arranged on a further inner peripheral side than the radial center of the bonded part.
Figure 7:
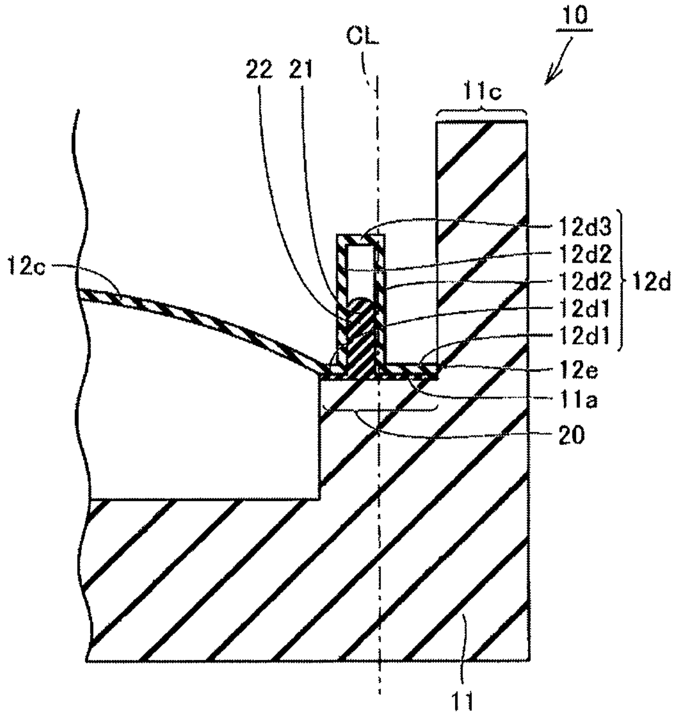

Hereinabove, the description is given of the case in which gap 22 is arranged on the further outer peripheral side than the radial center of bonded part 20. However, as shown in FIG. 7A, gap 22 may be arranged at the radial center thereof. In this case, gap 22 is a space surrounded by the bottom surface of top surface portion 12*d*3 of diaphragm member 12, surfaces of rising portions 12*d*2 facing each other on both sides of top surface portion 12*d*3, and the top surface of supporting portion 11*a* of frame 11.

Since gap 22 is arranged at the radial center of the bonded part 20, bottom surface portion 12*d*1 is bonded to supporting portion 11*a* of frame 11 on both sides of gap 22. Therefore, diaphragm member 12 can be more stably bonded to frame 11.

Further, as shown in FIG. 7B, gap 22 may be arranged on the further inner peripheral side than the radial center of bonded part 20. By arranging gap 22 on the further inner peripheral side than the radial center of bonded part 20, gap 22 can be configured so as to be covered with frame cover 13. Gap 22 can be protected by covering with frame cover 13.

Figure 8:
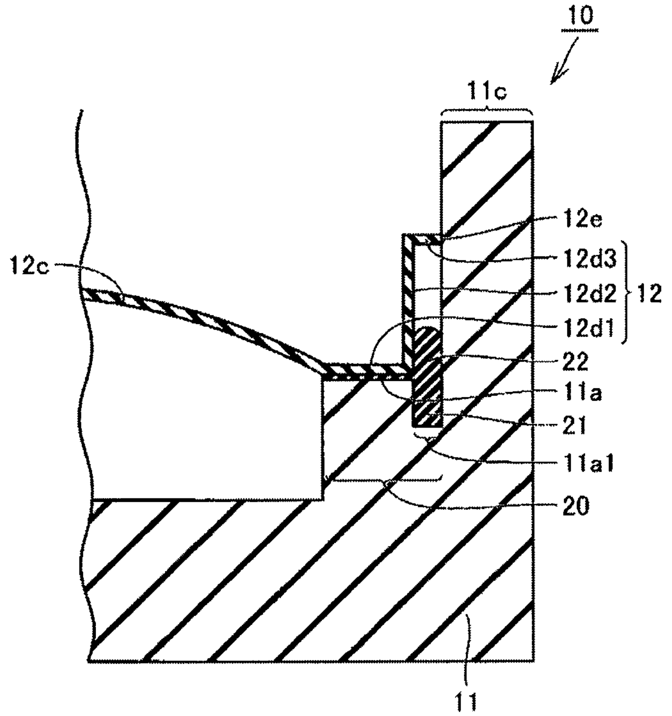
FIG. 8A is a cross-sectional view schematically showing a state in which the gap of the speaker unit according to Embodiment 1 of the present invention is formed by not only forming a convex portion on the diaphragm member but also forming a concave portion on the frame at the bonded part.
FIG. 8B is a cross-sectional view schematically showing a state in which the gap is formed by forming a concave portion on the frame at the bonded part.
Figure 8:
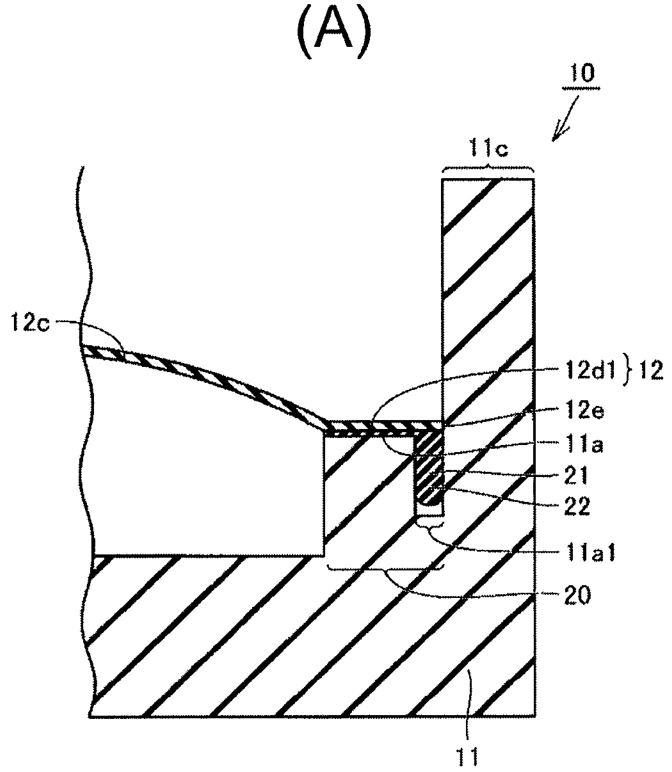

Hereinabove, the description is given of the case in which gap 22 is formed only on diaphragm member 12. However, as shown in FIG. 8A, gap 22 may be formed not only on the diaphragm member 12 but also on frame 11. Gap 22 is formed by not only forming a convex portion on diaphragm member 12 but also forming a concave portion on frame 11. In this case, gap 22 is a space surrounded by the outer peripheral surface of rising portion 12*d*2 and the bottom surface of the top surface portion 12*d*3 of diaphragm member 12, and the inner peripheral surface of the top end portion 11*c* of frame 11 and the groove 11*a*1 formed on supporting portion 11*a* thereof.

By forming gap 22 not only on diaphragm member 12 but also on frame 11, gap 22 can be formed on both of diaphragm member 12 and frame 11. Therefore, a volume of gap 22 can be easily adjusted.

Further, as shown in FIG. 8B, gap 22 may be formed only on frame 11. Gap 22 is formed by forming a concave portion on frame 11 at bonded part 20. In this case, gap 22 is a space surrounded by groove 11*a*1 formed on frame 11 and the bottom surface of bottom surface portion 12*d*1 of diaphragm member 12. By forming gap 22 only on frame 11, gap 22 can be formed by fabricating only frame 11.

Hereinabove, the description is given of the speaker unit configured in the circular shape when observed in planar view from upper side. However, the speaker unit may be formed in a rectangular shape when observed in planar view from upper side.

While the internal magnet type speaker unit is described above, the present Embodiment can also be applied to external magnet type speaker units. Hereinafter, one example of a configuration of an external magnet type speaker unit will be described. The configuration is the same as that of the above-described internal magnet type speaker unit unless otherwise stated. Further, the same elements will be given the same reference numerals and repetitive explanations thereof will be omitted.

Figure 9:
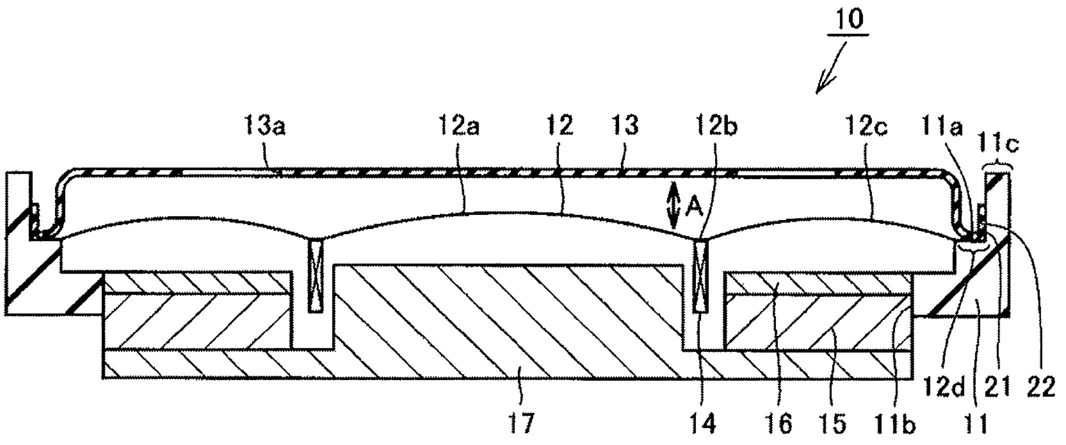
FIG. 9 is a cross-sectional view schematically showing an external magnet type speaker unit according to Embodiment 1 of the present invention.

With reference to FIG. 9, magnet 15 is arranged on the further outer peripheral side than voice coil 14 at a distance from the outer peripheral surface of voice coil 14 (external magnet type). Yoke 17 includes a portion (inner peripheral side portion) arranged on the further inner peripheral side than voice coil 14 at a distance from the inner peripheral surface of voice coil 14 and a portion (lower side portion) arranged under voice coil 14 and magnet 15. The lower side portion of yoke 17 is arranged at a distance from the bottom surface of voice coil 14. Magnet 15 is mounted on the lower side portion of yoke 17. Plate 16 is arranged on the top surface of magnet 15.

Further, the present Embodiment can also be applied to horizontal speaker units. Hereinafter, one example of a configuration of a horizontal speaker unit will be described. The configuration is the same as that of the above-described internal magnet type speaker unit unless otherwise stated. Further, the same elements will be given the same reference numerals and repetitive explanations thereof will be omitted.

Figure 10:
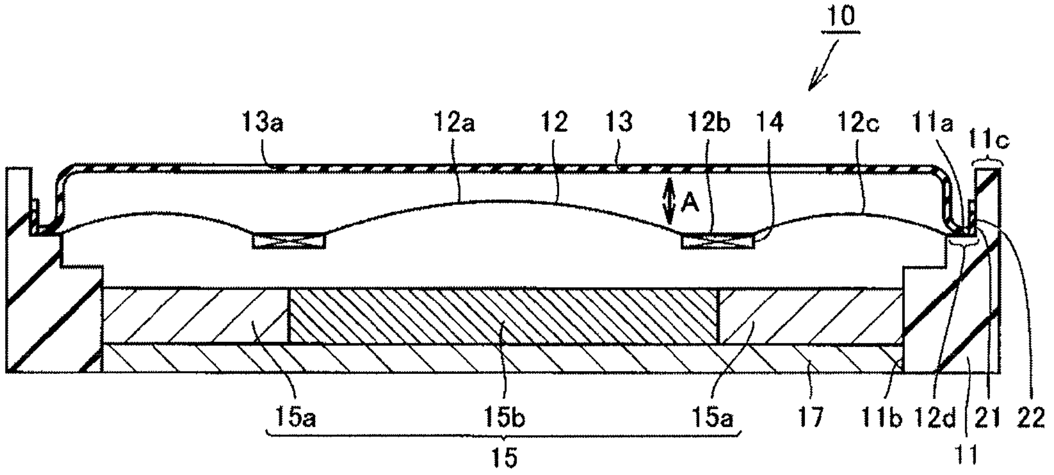
FIG. 10 is a cross-sectional view schematically showing a horizontal speaker unit according to Embodiment 1 of the present invention.

With reference to FIG. 10, voice coils 14 are formed by a shape having a larger number of laminations in a width direction thereof than in a thickness direction thereof (horizontal type). Voice coils 14 are arranged at a distance from each other above the top surface of magnet 15. Voice coils 14 are arranged so that magnetic flux generated by magnet 15 traverses voice coils 14.

Magnet 15 is magnetized in a thickness direction thereof Magnet 15 includes a pair of rectangular parallelepiped outer magnets 15*a* and rectangular parallelepiped inner magnet 15*b*. The pair of outer magnets 15*a* and inner magnet 15*b* are magnetized in reverse directions. For example, bottom surfaces of the pair of outer magnets 15*a* are magnetized as a north pole, whereas a top surface of inner magnet 15*b* is magnetized as a south pole. It is only necessary for the pair of outer magnets 15*a* and inner magnet 15*b* to be magnetized in reverse to each other.

Magnet 15 is secured by fitting outer peripheral surfaces of outer magnets 15*a* to inner peripheral surfaces of frame 11. Yoke 17 is arranged under magnet 15. Yoke 17 is secured by fitting side surfaces of yoke 17 to the inner peripheral surfaces of frame 11. Frame 11 supports magnet 15 and yoke 11 on the inner peripheral surfaces thereof.

Hereinabove, the description is given of the speaker unit as one example of the vibrator, but the present Embodiment can also be applied to MFDs. One example of a configuration of an MFD will be described below. The configuration is the same as that of the above-described internal magnet type speaker unit unless otherwise stated. Further, the same elements will be given the same reference numerals and repetitive explanations thereof will be omitted.

Figure 11:
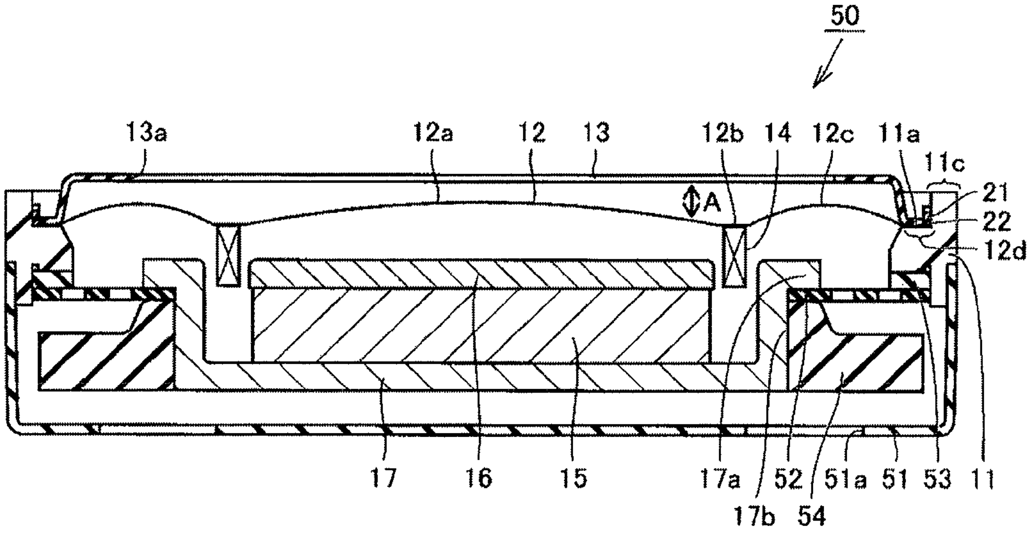
FIG. 11 is a cross-sectional view schematically showing an MFD according to Embodiment 1 of the present invention.

With reference to FIG. 11, in addition to the configuration of the above speaker unit, MFD 50 mainly includes case 51, elastic member 52, connection member 53, and securing member 54. Inside case 51 supporting frame 11, the magnetic circuit composed of magnet 15, plate 16, and yoke 17 is configured so as to be suspended from frame 11 by elastic member 52. Elastic member 52 is configured so as to vibratably support the magnetic circuit. One end of elastic member 52 is connected to frame 11 by connection member 53. The other end of elastic member 52 is arranged between protruding portion 17*a* of yoke 17 and securing member 54 to be connected to yoke 17. Outer peripheral surface 17*b* of yoke 17 is configured so as to contact with an inner peripheral surface of securing member 54. Case 51 has hole 51*a* formed therein.

Next, operation of MFD 50 will be described.

In MFD 50, a magnetic field generated by magnet 15 and alternate current flowing through voice coil 14 allows for the vibration of diaphragm member 12 attached to voice coil 14, similar to the speaker units. In MFD 50, elastic member 52 suspends the magnetic circuit, so that the magnetic circuit also vibrates. Since the magnetic circuit is heavier than diaphragm member 12, vibration of the magnetic circuit causes strong vibration. As a result, vibration function is provided.

Next, effects and advantages of the vibrator according to the present Embodiment will be described as compared to a conventional speaker unit.

Figure 12:
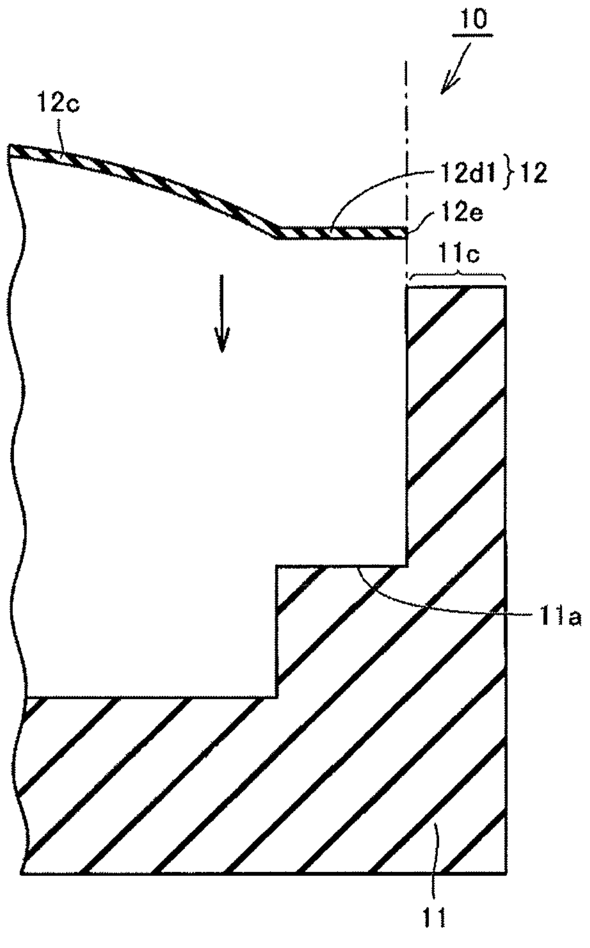
FIG. 12 is a cross-sectional view schematically showing a state in which a diaphragm member of the conventional speaker unit is mounted to a frame.
Figure 13:
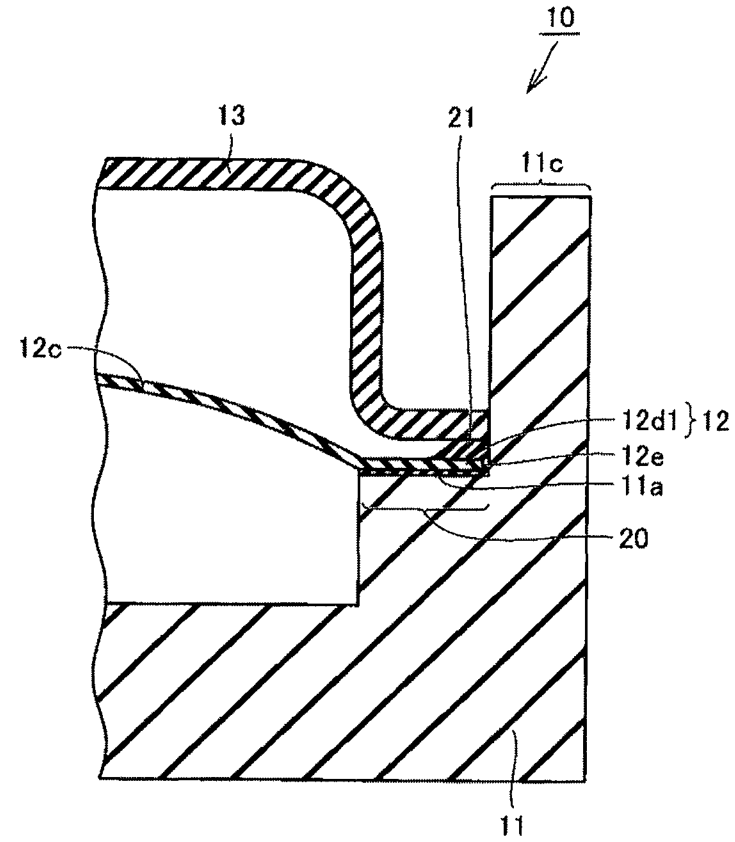
FIG. 13 is a cross-sectional view schematically showing a state in which the diaphragm member of the conventional speaker unit is bonded to the frame and a frame cover is mounted.

With reference to FIGS. 12 and 13, in conventional speaker unit 10, gap 22 to store an adhesive is not provided at any of surfaces of frame 11 and diaphragm member 12 facing each other at bonded part 20.

Diaphragm member 12 is mounted to frame 11 so that outer peripheral end 12*e* of diaphragm member 12 matches the inner peripheral surface of top end portion 11*c* of frame 11. In this case, adhesive 21 applied on supporting portion 11*a* is pressed by outer peripheral portion 12*d*. Therefore, adhesive 21 leaks out from between supporting portion 11*a* and outer peripheral portion 12*d* through outer peripheral end 12*e* and the inner peripheral surface of top end portion 11*c* to flow onto a top surface of outer peripheral portion 12*d*. As a result, the adhesive 21 is interposed between frame cover 13 and outer peripheral portion 12*d*.

Meanwhile, in the vibrator of the present Embodiment, gap 22 to store adhesive 21 is formed between the surfaces of frame 11 and diaphragm member 12 facing each other at bonded part 20. Because the adhesive can be stored in the gap, leakage of the adhesive out from between frame 11 and diaphragm member 12 can be prevented.

Therefore, the flow of adhesive 21 onto the top surface of diaphragm member 12 can be prevented. Accordingly, it can be prevented that adhesive 21 adheres to jig 31 pressing bonded part 20 from the top surface of diaphragm member 12. As a result, reduction in workability due to the adhesion of jig 31 to diaphragm member 12 can be prevented.

Further, when mounting a component such as frame cover 13 to the top surface of diaphragm member 12, it can be prevented that adhesive 21 flowing onto the top surface of diaphragm member 12 causes the mounting to be unsteady. It can also be prevented that variation occurs in the height dimensions of respective vibrators in which a component such as frame cover 13 is mounted to the top surface of diaphragm member 12.

Furthermore, in the vibrator of the present Embodiment, since voice coil 14 is secured to diaphragm member 12, vibration of voice coil 14 allows diaphragm member 12 to vibrate.

Additionally, in the vibrator of the present Embodiment, since gap 22 is arranged on the further outer peripheral side than the radial center of bonded part 20, upward leakage of adhesive 21 on the outer periphery can be more directly prevented. Rising portion 12*d*2 and top surface portion 12*d*3 are configured in such a manner that diaphragm member 12 bends from rising portion 12*d*2 to top surface portion 12*d*3 to contact with the inner peripheral surface of top end portion 11*c* of frame 11 at outer peripheral end 12*e*. Therefore, this configuration can more directly store in gap 22, adhesive 21 leaking out from between frame 11 and diaphragm member 12 upward of the outer periphery. In addition, as compared to the case in which gap 22 is arranged further inside than the outer peripheral side, the diameter of frame cover 13 can be made smaller.

Additionally, in the vibrator of the present Embodiment, since gap 22 is arranged at the radial center of bonded part 20, bottom surface portion 12*d*1 is bonded to supporting portion 11*a* of frame 11 on both sides of gap 22. Accordingly, diaphragm member 12 can be more stably bonded to frame 11.

Additionally, in the vibrator of the present Embodiment, since gap 22 is arranged on the further inner peripheral side than the radial center of bonded part 20, gap 22 can be configured so as to be covered with frame cover 13. Therefore, covering with frame cover 13 can protect gap 22.

Additionally, in the vibrator of the present Embodiment, since gap 22 is formed by forming the convex portion on diaphragm member 12 at bonded part 20, gap 22 can be formed by fabricating only diaphragm member 12. Therefore, production efficiency when producing the vibrator can be increased.

Additionally, in the vibrator of the present Embodiment, since gap 22 is formed by forming the concave portion on frame 11 at bonded part 20, gap 22 can be formed by fabricating only frame 11. Therefore, production efficiency when producing the vibrator can be increased.

Additionally, in the vibrator of the present Embodiment, since diaphragm member 12 is positioned with respect to frame 11 by contacting with frame 11 at outer peripheral end 12*e*. There is no need for adding a structure for positioning, which thus can increase production efficiency when producing the vibrator.

Additionally, in the vibrator of the present Embodiment, gap 22 has the height of 0.1 mm to 0.3 mm and the width of 0.1 mm to 0.2 mm, which thus can ensure that gap 22 stores adhesive 21.

( Embodiment 2)

First, a configuration of a vibrator according to Embodiment 2 of the present invention will be described. In the present Embodiment, a description will be mainly given of a speaker unit as one example of the vibrator. The present Embodiment is principally different from Embodiment 1 in that peripheral portion 12*c* of the diaphragm has falling portion 12*c*1.

Figure 14:
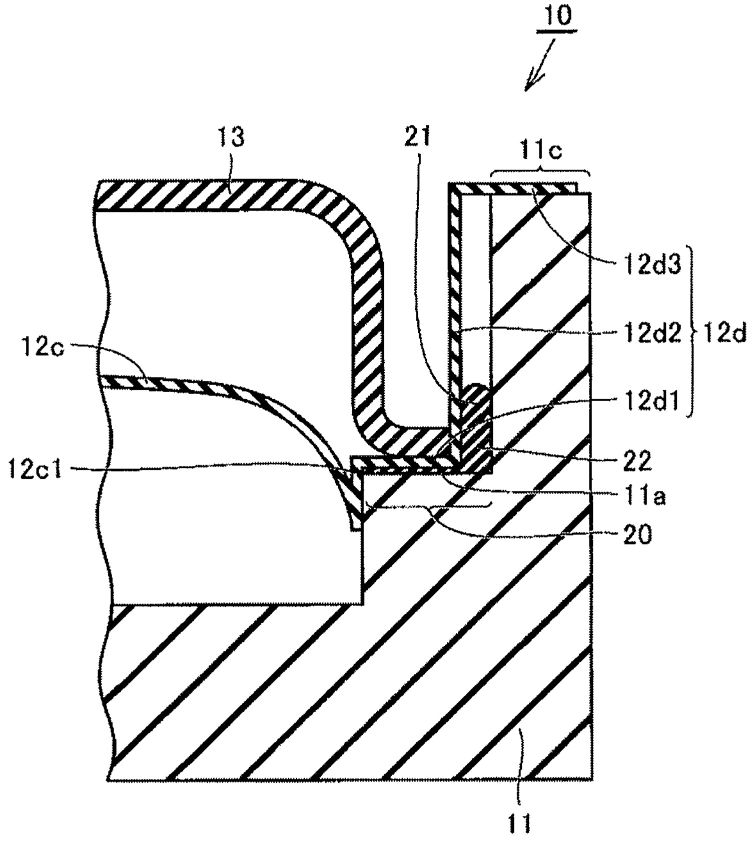
FIG. 14 is a cross-sectional view schematically showing a state in which a diaphragm member of a speaker unit according to Embodiment 2 of the present invention is bonded to a frame and a frame cover is mounted.

With reference to FIG. 14, diaphragm member 12 is configured so as to be positioned with respect to frame 11 by contacting with frame 11 on a further inner peripheral side than bonded part 20 of diaphragm member 12. Falling portion 12*c*1 is formed on peripheral portion 12*c* of diaphragm member 12 and configured so as to position diaphragm member 12 with respect to frame 11. Falling portion 12*c*1 is configured so as to contact with a surface of frame 11 falling from supporting portion 11*a* thereof. Falling portion 12*c*1 is configured so as to incorporate to bottom surface portion 12*d*1 at an upper portion thereof.

Falling portion 12*c*1 may be configured so as to incorporate to an arc shape part of peripheral portion 12*c* at a lower portion thereof. The arc shape part of peripheral portion 12*c* is formed in an arc shape when observed in the cross-section. Further, top surface portion 12*d*3 of diaphragm member 12 may be configured so as to contact with the top surface of top end portion 11*c* of frame 11.

Other configurations in the present Embodiment are the same as those in Embodiment 1 described above. Therefore, the same elements will be given the same reference numerals and repetitive explanations thereof will be omitted.

Next, a description will be given of a method for mounting the diaphragm member to the frame in the speaker unit according to the present Embodiment.

Figure 15:
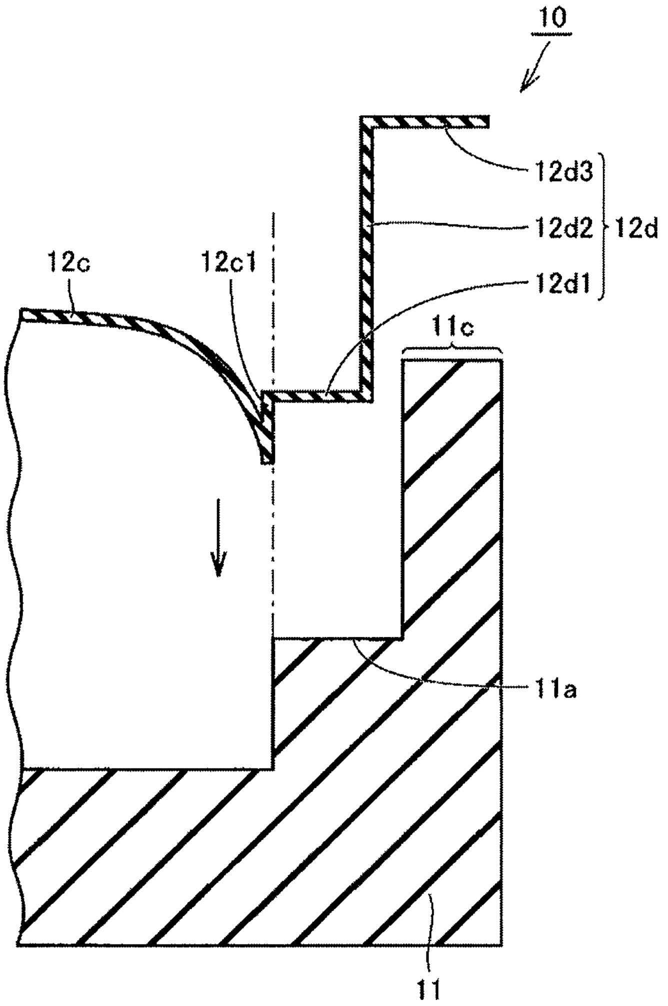
FIG. 15 is a cross-sectional view schematically showing a state in which the diaphragm member of the speaker unit according to Embodiment 2 of the present invention is mounted to the frame.

With reference to FIG. 15, diaphragm member 12 is positioned with respect to frame 11 by contacting with frame 11 on the further inner peripheral side than bonded part 20 of diaphragm member 12. The outer peripheral surface of falling portion 12*c* of diaphragm member 12 is positioned so as to contact with the surface falling from supporting portion 11*a* of frame 11. Therefore, diaphragm member 12 can be more appropriately positioned with respect to frame 11.

Further, top surface portion 12*d*3 of diaphragm member 12 may be positioned so as to contact with the top surface of top end portion 11*c* of frame 11. Since diaphragm member 12 is positioned with respect to frame 11 at both of rising portion 12*c*1 and top surface portion 12*d*3, the positioning of diaphragm member 12 with respect thereto can be further ensured. In addition, since top surface portion 12d3 is positioned so as to be mounted to the top surface of top end portion 11*c*, it can be easy to handle diaphragm member 12. Therefore, positioning work can be easily performed.

Hereinabove, the internal magnet type speaker unit is exemplified. However, the present Embodiment can be applied to the external magnet type speaker unit, the horizontal speaker unit, and the MFD described in Embodiment 1.

Next, effects and advantages of the vibrator according to the present Embodiment will be described.

As described above, the present Embodiment has the same effects and advantages as those in Embodiment 1.

Additionally, since diaphragm member 12 is positioned with respect to frame 11 by contacting with frame 11 on the further inner peripheral side than bonded part 20 of diaphragm member 12, displacement of diaphragm member 12 toward the outer peripheral side is prevented. Therefore, diaphragm member 12 can be more appropriately positioned with respect to frame 11.

(Embodiment 3)

First, a configuration of a portable information terminal according to the present Embodiment will be described. The present Embodiment will describe a portable information terminal provided with the vibrator of Embodiment 1 or 2.

Figure 16:
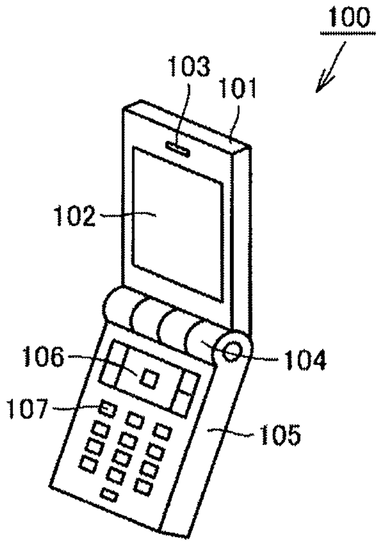
FIG. 16 is a perspective view schematically showing a portable information terminal according to Embodiment 3 of the present invention.
Figure 17:
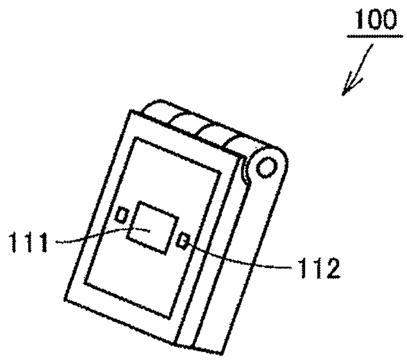
FIG. 17 is a perspective view schematically showing a closed state of the portable information terminal according to Embodiment 3 of the present invention.

With reference to FIGS. 16 and 17, portable information terminal 100 according to the present Embodiment is a mobile phone and mainly provided with upper casing 101, display section 102, sound output hole 103, hinge portion 104, lower casing 105, operation button 106, number buttons 107, display section 111, sound output holes 112, and the vibrator of Embodiment 1 or 2, which is not shown.

With reference to FIG. 16, display section 12 is provided on a surface of upper casing 101. Sound output hole 103 is formed on one end side of the surface of upper casing 101, and hinge portion 104 is formed on the other end side of upper casing 101. Hinge portion 104is formed on one end side of lower casing 105. Hinge portion 104 connects upper casing 101 to lower casing 105 in an openable and closable manner. Operation button 106 is formed near hinge portion 104 on a surface of lower casing 105. Number buttons 107 are formed from operation button 106 toward a side opposite to hinged portion 104.

With reference to FIG. 17, display section 111 is provided on a back surface of upper casing 101. Sound output holes 112 are formed next to display section 111.

The not-shown vibrator of Embodiment 1 or 2 is provided inside upper casing 101. From a speaker unit or an MFD as one example of the vibrator, mainly through sound output holes 103 and 112, sounds are output outside portable information terminal 100. In addition, vibration is generated by the MFD.

Next, effects and advantages of the portable information terminal according to the present Embodiment will be described.

Portable information terminal 100 according to the present Embodiment is provided with the vibrator described in the Embodiment 1 or 2 and thus has the same effects and advantages as those in the Embodiment 1 or 2.

In addition, it can be prevented that, when mounting a component such as frame cover 13 to the top surface of diaphragm member 12, the mounting becomes unsteady due to adhesive 21 flown onto the top surface of diaphragm member 12. It can also be prevented that variation occurs in the height dimensions of respective vibrators in which a component such as frame cover 13 has been mounted to the top surface of diaphragm member 12. Therefore, the vibrator can be mounted in portable information terminal 100 with higher precision, and also design flexibility can be improved.

Although the present Embodiment is described the portable information terminal using the example of the mobile phone, the present invention is not restricted thereto and can be applied to digital cameras, personal computers, game machines, PDAs, and the like.

The vibrator according to the present invention may be configured by appropriately combining the respective configurations of the above-described respective Embodiments.

It should be considered that the disclosed Embodiments of the present invention are exemplifications in all aspects and not restrictive. It is intended that the scope of the present invention should be defined not by the above description but by the claims and encompass every modification in the scope of the claims and in the meaning of equivalence of the claims.

INDUSTRIAL APPLICABILITY

The present invention can be particularly advantageously applied to vibrators including a frame and a diaphragm member vibratably bonded to the frame at a bonded part and to portable information terminals.

DESCRIPTION OF THE REFERENCE NUMERALS

10 Speaker unit
11 Frame
11*a* Supporting portion
11*a*1 Groove
11*b* inner peripheral portion
11*c* Top end portion
12 Diaphragm member
12*a* Center portion
12*b* Flat portion
12*c* Peripheral portion

12*d* Outer peripheral portion
12*d*1 Bottom surface portion
12*d*2 Rising portion
12*d*3 Top surface portion
12*e* Outer peripheral end
13 Frame cover
14 Voice coil
15 Magnet
16 Plate
17 Yoke
20 Bonded part
21 Adhesive
22 Gap
31 Jig
31*a* Protruding portion
50 MFD
51 Case
52 Elastic member
53 Connection member
54 Securing member
100 Portable information terminal
101 Upper casing
102 Display section
103 Sound output hole
104 Hinge portion
105 Lower casing
106 Operation button
107 Number buttons
111 Display section
112 Sound output holes

The invention claimed is:

1. A vibrator comprising:

a frame having a supporting portion and a top end portion that is formed on an outer peripheral side of the supporting portion, a side wall of the frame arranged between the top end portion and the supporting portion;

a diaphragm member vibratably bonded to the frame, the diaphragm member having a bottom surface portion bonded to the supporting portion of the frame to form a bonded part, a rising portion that is arranged to protrude vertically upwards, and a top surface portion that extends horizontally towards the side wall of the frame;

an adhesive used to bond the frame to the diaphragm member; and, a gap formed between the frame and the diaphragm member facing each other, the gap being a space formed by the rising portion and the top surface portion of the diaphragm member, and the supporting portion and the side wall of the frame, the gap being used to store the adhesive and being in communication with the bonded part.

2. The vibrator according to claim 1, further comprising:

a voice coil secured to the diaphragm member; and a magnet arranged at a distance from the voice coil.

3. The vibrator according to claim 1, wherein the gap is arranged on a further outer peripheral side than a radial center of the bonded part.

4. The vibrator according to claim 1, wherein the gap is formed by forming a concave portion on the frame at the bonded part.

5. The vibrator according to claim 1, wherein the diaphragm member is positioned with respect to the frame by contacting with the frame at an outer peripheral end of the diaphragm member.

6. The vibrator according to claim 1, wherein the diaphragm member is positioned with respect to the frame by contacting with the frame on a further inner peripheral side than the bonded part of the diaphragm member.

7. The vibrator according to claim 1, wherein the gap has a height of 0.1 mm to 0.3 mm and a width of 0.1 mm to 0.2 mm.

8. A portable information terminal including the vibrator according to claim 1.

9. The vibrator according to claim 1, wherein a tip of the top surface portion of the diaphragm member is in contact with the side wall of the frame, such that the gap forms an enclosed area between the frame and the diaphragm member.

10. The vibrator according to claim 1, wherein the side wall of the frame and the rising portion of the diaphragm member are arranged parallel to each other.

11. The vibrator according to claim 1, wherein a diaphragm member is vibratably and directly bonded to the frame.

12. A vibrator comprising:

a frame having a supporting portion and a top end portion that is formed on an outer peripheral side of the supporting portion;

a diaphragm member vibratably bonded to the frame, the diaphragm member having a bottom surface portion bonded to the supporting portion of the frame to form a bonded part, rising portions that are arranged to protrude vertically upwards, and a top surface portion that extends horizontally on top of the rising portions;

an adhesive used to bond the frame to the diaphragm member; and a gap formed between surfaces of the frame and the diaphragm member facing each other, the gap being an enclosed space formed by the top surface portion, the rising portions facing each other on both sides of top surface portion, and the supporting portion, the gap being used to store the adhesive and being in communication with the bonded part.

13. The vibrator according to claim 12, wherein the gap is arranged at a radial center of the bonded part.

14. The vibrator according to claim 12, wherein the gap is arranged on a further inner peripheral side than a radial center of the bonded part.

* * * * *